Figure 1:
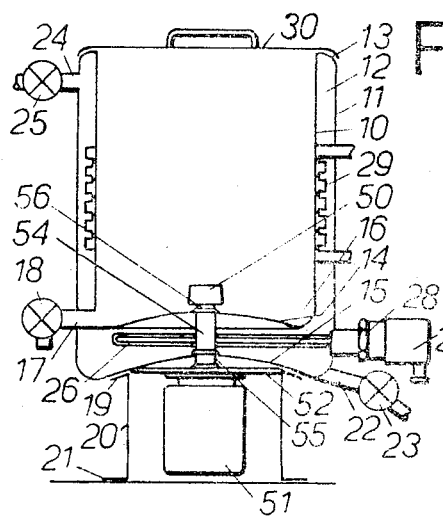

Nov. 15, 1966     A. BRATLAND     3,285,331
COMBINED MIXING AND HOMOGENISING APPARATUS
Filed May 19, 1965     3 Sheets-Sheet 1

INVENTOR:
ARTHUR BRATLAND
BY
Breitenfeld & Levine
ATTORNEYS

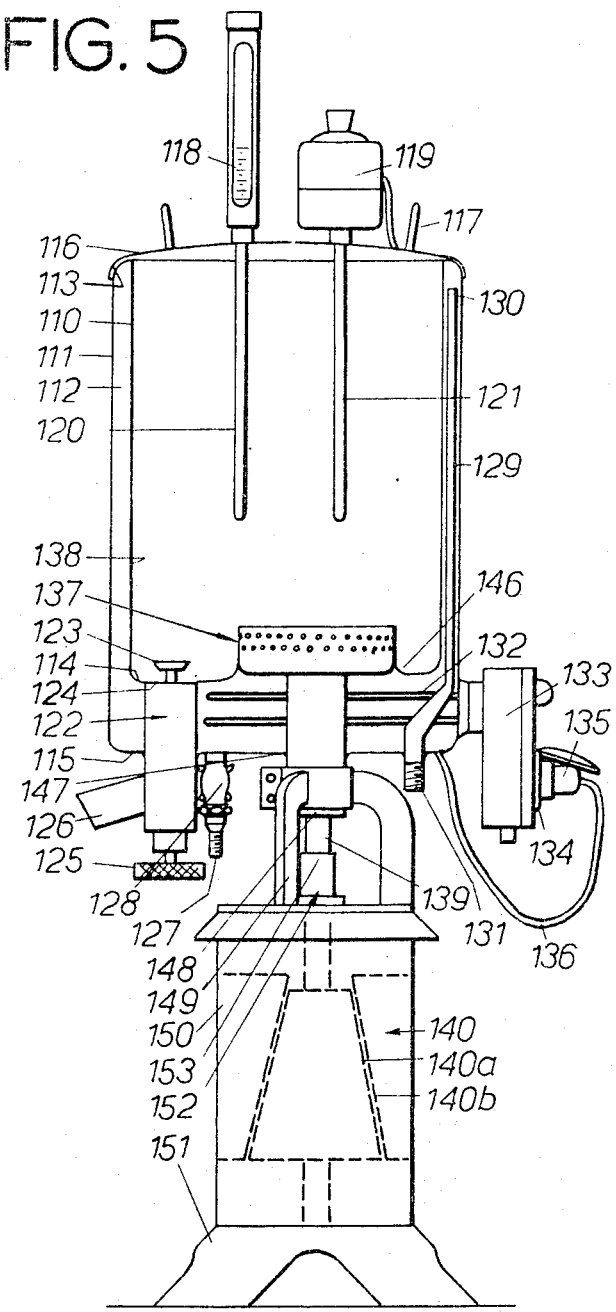

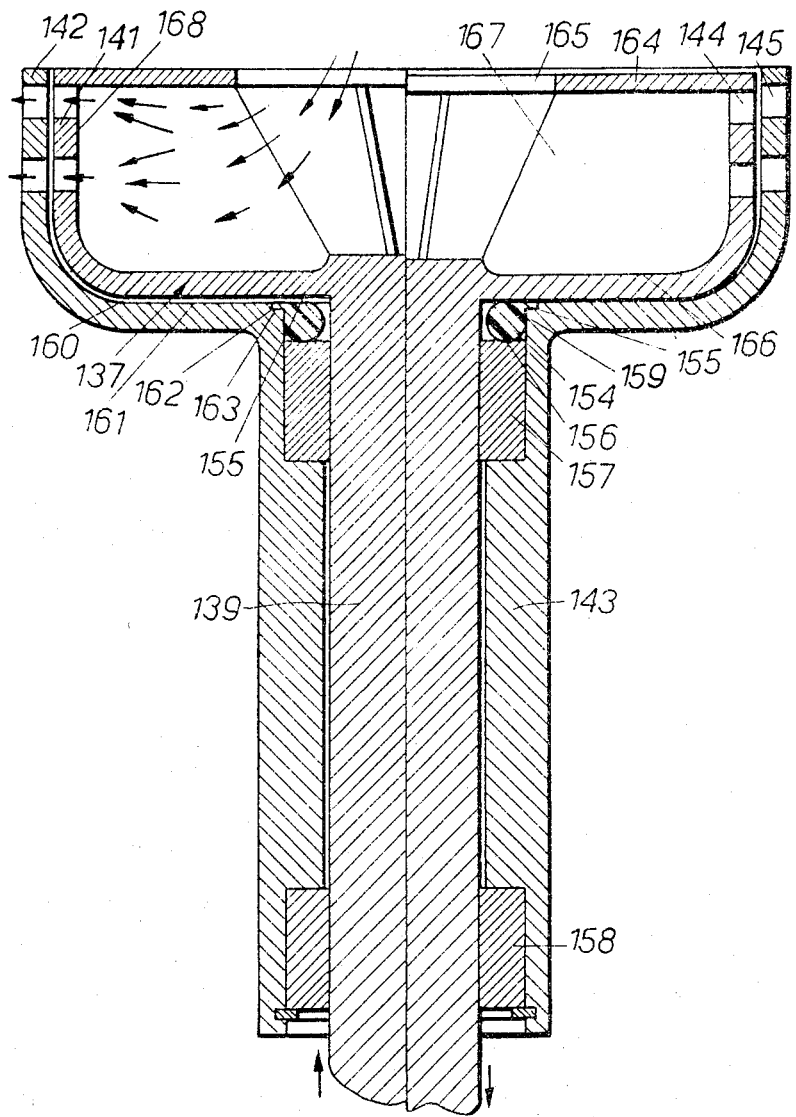

United States Patent Office 3,285,331
Patented Nov. 15, 1966

3,285,331
COMBINED MIXING AND HOMOGENISING
APPARATUS
Arthur Bratland, Konnerudgaten 3, Drammen, Norway
Filed May 19, 1965, Ser. No. 456,916
Claims priority, application Norway, May 21, 1964,
153,329; Mar. 9, 1965, 157,115
10 Claims. (Cl. 165—109)

This invention relates to a combined mixing and homogenising apparatus including an inner container for the reception of material which is to be treated in the apparatus which inner container is at least partially surrounded by a heat-exchange chamber having conduit means for the supply and discharge of a heat-exchange medium and within the inner container receives a motor-driven stirring and homogenising arrangement comprising a stationary part having through-passages for the material which is to be treated and a rotatable part having means for subjecting the material which is to be treated to rapid movement through the through-passages.

The apparatus is generally applicable for various materials, but is especially designed for foodstuffs and especially foodstuffs which contain milk or milk-forming ingredients. An important application is in connection with the regeneration of dried milk to milk, for example for the production of "soft ice cream" from dried milk, water, vegetable or animal fats, flavouring materials and other additive materials. It is known to permit the manufacture of such products to be effected in one and the same container and to allow the manufacture to be effected in three stages which run more or less into one another, namely a heating stage (pasteurisation), an homogenisation stage and cooling down stage. It has previously been proposed to place the stirring and homogenising arrangement in the inner container with the driving motor located on top of the container. In order to facilitate handling of the apparatus it is desirable, however, to be able to locate the motor below the apparatus with the driving shaft extending through the base of the container. As a result, however, there will be big problems in gaining access to the homogensing arrangement so as to clean and sterilise the apparatus in an easy and proper manner and at the same time in preventing leakage at the base of the inner container. In handling foodstuffs and especially milk products, where the danger of infection is especially great, health authorities make strict demands on easy and proper cleaning. In order to avoid leakage to or accumulation of the treated materials outside the area which is to be cleaned in the apparatus, it is of the greatest importance that a dependable and effective sealing is provided between the inner container and the driving shaft of the rotor. A main object of the present invention is to provide an apparatus in which leakage between a stationary part and a rotatable part can be avoided, which is immersed in fluid or in a similar material, with the rotatable part at rest and in rotation respectively. It is a fact that the larger the rate of revolution given to such rotatable parts, the greater the possibility is for increase in over-heating and wear. The present invention aims specially at providing a dependable sealing for the rotatable part, even at very high rates of revolution, for example at 15–20,000 revolutions per minute.

This is achieved according to the invention in that the rotatable part, the shaft of which extends through the base of the inner container, is demountably fixed in the apparatus, and in that the rotatable part in the stationary position is sealed against the stationary part by means of mutually parallel sealing surfaces, and in that the rotatable part is axially displaceable a certain distance relation to the stationary part, so that the sealing can be broken on rotation of the rotatable part, and in that the through-passages in the stationary part together with a branch passage from the through-passages to the intermediate space between the stationary and the rotatable parts' sealing surfaces, form an ejector mechanism to substitute for the sealing which is released on rotation of the rotatable part.

In a first embodiment according to the invention the axial displacement of the rotatable part relative to the stationary part is obtained by means of the force of reaction in the rotatable part which acts on the flow of material in an oppositely directed movement. In another embodiment according to the invention the axial displacement of the rotatable part relative to the stationary part is obtained due to the rotatable part being rotatably and axially displaceably connected to a rotor of an electric driving motor, which can be axially displaced by means of the effect of an electromagnetic field in a manner known per se, to a certain distance relative to the stator of the motor and in opposite directions on starting up and stopping the motor.

Figure 2:
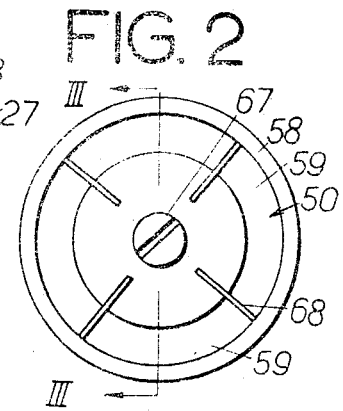
Figure 3:
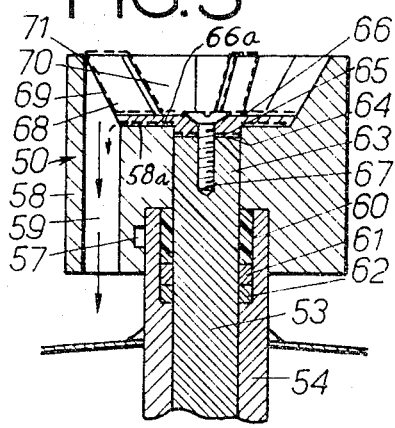
Figure 4:
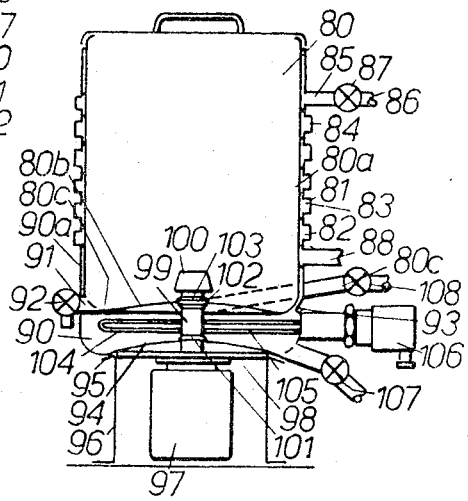

In order that the invention can be more clearly understood, convenient embodiments thereof will now be described, by way of example, with reference to the accompanying drawings in which:

FIGURE 1 is a vertical section through an apparatus according to a first embodiment, FIGURE 2 is a plan of the stirring and homogenising arrangement in the embodiment of FIGURE 1, FIGURE 3 is a section on the line III–III of FIGURE 2, FIGURE 4 is a vertical section corresponding to FIG. 1 and through an apparatus according to a second embodiment, FIGURE 5 is a vertical section through an apparatus according to a third embodiment, and FIGURE 6 is a vertical section of the stirring and homogenising arrangement in the embodiment of FIG. 5.

The apparatus as shown in FIG. 1 is provided with an inner container 10 and an outer container 11, which define an intermediate closed chamber 12. At the top the outer container 11 is connected to the inner container by an inwardly curved top edge 13 which is welded to the inner container. The base 14 of the inner container and the base 15 of the outer container are curved convexly upwards. The base 14 extends at the periphery to an accumulation pocket 16 uniformly curved in the container's cylindrical wall. From the accumulation pocket 16 there extends outwardly a discharge pipe 17 having a valve 18. The base 15 of the outer container bears against an upper flange 19 of a cylindrical foot piece 20 the lower flange 21 of which can be secured to a suitable table base. From the lower peripheral portion of the outer container there extends downwardly and outwardly a conduit 22 having a two-way valve 23. At the top of the apparatus a conduit 24 having a two-way valve 25 is connected to the chamber 12. In the space between the base 14 of the inner container and the base 15 of the outer container, there extends along the peripheral portion of the base of the container a crescent-shaped heating element 26. The heating element is provided with a stuffing box 27 and is secured to the outer container by means of a nipple nut 28. In the chamber 12 there is also located a cooling spiral 29 which lies directly against the wall of the inner container some distance above the base 14 of the container. The top opening of the inner container is covered with a removable lid 30 which rests against the top edge 13 of the outer container.

A first form of stirring and homogenising arrangement 50 is illustrated in FIG. 2 and 3 and is shown fixed at the base of the inner container. The motor 51 of the arrangement 50 is screened within the foot piece 20 and is fixed to a plate 52 which is welded along the periphery of the base 15 of the outer container, so that the motor 51 loads the base of the outer container with the motor's weight. The shaft 53 of the motor 51 is directed inwards into the inner container 10 between a guide 54 which is formed by a stock pipe, which is welded at 55 to the outer container 11 and at 56 to the inner container 10. The pipe 54 projects a distance above the base 14 of the inner container. At the top of the pipe 54 there is fixed by means of a bayonet joint 57 a removable head piece 58 having three channels 59 located eccentrically (FIG. 2), longitudinally in the direction of the periphery which extend parallel to the axis of the shaft 53 of the motor (FIG. 3). The shaft 53 is received in the pipe 54 in an outer parallel bearing 60 of nylon and two inwardly disposed packing boxes 61, 62 provided with separation rings. The shaft 53 projects above the pipe 54 having a spindle 63 the top portion of which is provided with a transverse slot 64 for the reception of a downwardly directed projection 65 on a rotatable part in the form of a blade rotor 66. The blade rotor 66 is also secured to the shaft 53 by a screw 67. The top side of the rotor 66 supports four vanes 68 which extend obliquely upwards and outwards. The outer edge 69 of the vanes 68 is led along a cone surface 70 in the head piece 58. Between the channels 59 and the cone surface 70 there is formed a sharp terminating edge 71.

The bottom side of the rotor is radially outside the projection 65 provided with a plane, outwardly radially extending sealing surface 66a which, when the rotor is at rest, is adapted to bear and form a sealing abutment on a corresponding sealing surface 58a on the head piece 58.

On rotation of the blade rotor 66 the material in the inner container is given a powerful flow movement downwards through the through-passages 59. At the same time as this the blade rotor will be delayed for an upwardly directed reaction force which can bring or assist in bringing the sealing surface 66a of the blade rotor out of engagement with the sealing surface 58a of the head piece 58 immediately the rotor is set in motion. Only a quite small axial displacement is required, for example of the order of 0.5 mm. The axial movement can be adjusted by either connecting the rotor to be axially displaceable with the driving shaft (for example adjustment by the screw 67) so as to be displaced an exact predetermined distance relative to this or by allowing the rotor and its driving shaft to be displaceable together by such a predetermined distance (adjusted by regulating means not shown).

The powerful flow movement through the through-passages 59 exerts an ejector effect towards the branch passage which is formed between the surfaces 66a and 58a, when the sealing abutment is broken and in consequence prevents leakage past the sealing surfaces when the rotor rotates.

Instead of direct surface-to-surface abutment between the sealing surfaces, such as is shown in FIG. 3, a sealing ring can be arranged between the surfaces, such as will be described below with reference to an alternative construction of stirring and homogenising arrangement.

As is shown in FIG. 3 the through-passages open out a relatively short distance above the base portion of the inner container, so that the latter can form an impact surface for the flow of material through the through-passages thereby assisting in the break-down of the particles of material and bringing them into definite contact with the base portion of the inner container so as to achieve an effective heat transfer between the flow of material and the heat-transfer medium in the chamber 12.

The base 14 of the inner container can extend more or less horizontally just in the region of impact of the flow of material, so that the flow of material is guided substantially at right angles against the impact surface. The impact surface is bounded on the one side by the extension of the stock pipe 54 into the container and on the other side of the base extends obliquely downwards and outwards and is curved round the accumulation pocket uniformly into the walls of the inner container. In this way it is possible to direct the flow of material from the head piece 58 to bear against the base of the inner container and a substantial distance further upwards to bear against the side walls of the inner container, thereby to cause great movement in the material along the contact surfaces which border on the heat emitting or heat absorbing chamber 12 and the cooling spiral 29.

On cleaning after final use of the apparatus the inner container is filled with a suitable cleaning agent and this is allowed to circulate in the inner container by means of the arrangement 50. The circulation around and in the arrangement 50 is sufficient to draw off with it possible residual particles of material and the flow along the base of the inner container and walls creates a substantially scouring effect. It is also possible to heat up the cleaning agent by means of the heating element 26 in the chamber 12.

For further proper cleaning the stirring and homogenising arrangement can be easily dismantled from the inner container. First the screw 67 is loosened so that the blade rotor can be removed and afterwards the head piece can be freed from engagement with the pipe 54 by releasing the bayonet joint 57, so that the whole of the arrangement can be cleaned. The sealing between the pipe 54 and the head piece 58, which are both stationary, does not present any particular difficulty in maintaining leakage free. The sealing between the rotatable part, that is to say the blade rotor 66, and the stationary part, that is to say the head piece 58 is achieved, in the embodiment illustrated, partly between the sealing surfaces 66a and 58a and by means of the ejector effect and partly by means of the packing boxes 61, 62. The construction described is especially suitable for moderate rates of revolution. At higher rates of revolution it is desirable to avoid the packing boxes as shall be described further on in the description with reference to an alternative embodiment.

The apparatus as shown in FIGURE 4 is provided with an inner container 80, the cylindrical wall portion 80a of which is surrounded by a jacket plate 81, in which there is constructed a helically-shaped peripheral groove 82. The edge portions 83 of the peripheral groove bear against the outer wall of the inner container 80, so that between the outer wall of the inner container 80 and the peripheral groove 82 of the jacket plate 81 and its edge terminations 83 is formed a helically shaped passage 84 along the inner container. The passage 84 communicates above with an inlet 85 from a feed conduit 86 for cooling medium via a valve 87 and below with a discharge 88. By means of the valve 87 the supply of cooling medium to the passage 84 can be opened and closed and by closing off the passage 84 is placed under atmospheric pressure thereby enabling the cooling medium to be completely drained off from the passage 84.

In order to obtain good heat conduction between the material in the inner container 80 and the cooling medium in the passage 84 the inner container 80 can be constructed from a rather thin sheet material. The necessary strength and rigidity in the container can be obtained by means of the surrounding jacket plate 81 which can be constructed of thicker sheet material and which besides can support the plate of the inner container by means of the corrugations which are formed by the peripheral groove 82. It is preferred to weld, for example spot weld, the edge terminations 83 of the peripheral groove directly to the inner container 80, or if desired with a suitable intermediate sealing material. In this way it is ensured firstly that the plate of the inner container has a uniform intermediate space to the supporting jacket plate 81 and secondly it is ensured that there is a separation between each helix in the passage 84. Externally the jacket plate can be covered with a suitable heat insulating material.

At the lower part of the cylindrical portion 80a of the inner container there is secured an upper cylindrical portion 90a of a base container 90 of relatively thick sheet material. The base portion 80b of the inner container extends from the central axis of the container obliquely downwards and outwards to a rounded-off edge 80c at the lower part of the container's cylindrical portion. From the rounded-off edge 80c there extends a draining channel 91 outwards through the wall portion of the base of the container 90 to a drain cock 92. As shown at 93 the container base is curved concavely inwards below the rounded-off edge 80c of the inner container, so that the inner container can be supported having the rounded-off edge against the container base. The base portion 94 of the base container 90 which is constructed to correspond substantially to the base portion 80b of the inner container rests just within its rounded-off edge 95 against a base pedestal 96. A motor 97 which is suspended from a plate 98 secured to the base portion 94 of the base container passes with a guide 99 for the motor shaft (not shown) through the base portion 94 of the base container and through the base portion 80b of the inner container. The stirring and homogenising arrangement which is shown at 100 corresponds to the arrangement in FIGS. 2 and 3. The guide 99 is secured to the base container by a welding 101 and the inner container rests upon a shoulder 102 on the guide and is secured to the guide by a welding 103. In this way safe support of the relatively thin-walled inner container is attained against the base container at the central axis of the container.

In the chamber 104 which is formed between the inner container 80 and the base container 90 there is received a crescent-shaped heating element 105 which receives current supply through a packing box 106. The chamber 104 communicates below with a valve control, combining fluid inlet and fluid discharge 107 and above with a valve control fluid overflow 108.

The apparatus as shown in FIGS. 5 and 6 includes an inner container 110 and an outer container 111, which define an intermediate closed chamber 112. Above the outer container is connected to the inner container by an inwardly curved top edge 113 which is welded to the inner container. The base of the inner container is shown at 114 and the base of the outer container at 115.

The container 110, 111 is provided with a lid 116 with supporting handles 117. The lid rests against the top edge 113 of the container. To the lid 116 there is fixed a thermometer 118 and a temperature regulator 119, the measuring heads 120, 121 project a substantial distance down into the inner container 110.

The container 110, 111 is provided with a draining valve 122 for draining off the contents of the inner container at the base of the container. The valve 122 is provided with a valve body 123 which is axially displaceable in a vertical direction, being shown in the drawing in the open position, displaced upwards in the inner container. In order to facilitate draining off of the contents of the inner container the base 114 of the inner container is preferably inclined downwards towards the inlet 124 to the valve 122. At 125 there is shown a hand wheel for operation of the valve 122. At 126 there is shown a drain.

The chamber 112 communicates with a hydraulic water conduit (not shown) via a coupling union 127 having a control valve 128, at the lower end of the chamber 112, that is to say at the base 115 of the outer container, and communicates with a water discharge conduit (not shown either) via a drain pipe 129, the upper mouth 130 of which is located at the top portion of the chamber 112 as shown at the top edge 113, and the lower end 131 of which extending through the base 115 of the outer container, forms a coupling union for the discharge conduit. The coupling union 127 can be coupled all according to the conditions to a cold water conduit, to a conduit from a hot water geyser or a conduit from a cooling arrangement, while the coupling union 131 can be coupled to the sewer or in a suitable circulation system. In the space between the base 114 of the inner container and the base 115 of the outer container there extends along the peripheral portion of the base of the container a crescent-shaped heating element 132 from a coupling box 133 with a contact 134 for a plug 135 having a lead connection 136 to the temperature regulator 119 and further through the latter to a current supply control (not shown).

An alternative form of stirring and homogenising arrangement is shown at 137 in FIG. 6. The stirring and homogenising arrangement is located at the base of the inner container having a shaft 139, which is connected to an electrical driving motor, extending through the bases of the inner and outer container. The arrangement 137 consists of an upwardly opening cup-shaped inner part 141 which is secured to the shaft 139 and an upwardly opening cup-shaped outer part 142 which is fixed directly to the inner container 110 and which is secured to the outer container 111 above a sleeve part 143. The inner part 141 is freely rotatably received in the outer part 142 with a clearance of 0.5 mm. between the vertical walls of the cup-shaped parts. The cup-shaped parts are each provided in the embodiment illustrated with horizontal rows of through holes 144, 145 totalling 240. The holes have a diameter of 5 mm. and the cup-shaped parts 110, 111 are 4 mm. thick. The peripheral speed of the inner part can be from between 10 and 50 meters per second, and the number of revolutions can be of the order of about 15000 revolutions per minute. By means of the cup-shaped, through-holed parts there is obtained due to the effect of centrifugal force during rotation of the inner part in the outer part a radial hurling out of the fluid or material in the container through the holes 144, 145 and at the same time as this a breaking down or cracking of the particles which the fluid or material contains, on passage through the holes 144, 145 and into the intermediate space between the parts 141 and 142. The combined number of holes or the number of rows of holes or the number of holes in each of the cup-shaped parts can be altered all according to which effect is required and which substance is to be treated. Correspondingly the diameter of the holes or pattern for the disposition of the holes relative to one another can be altered.

In the construction illustrated the outer part 141 is secured at the transition between its vertical wall and the horizontal base to an upward rounded-off portion 146 of the base 114 of the inner container. The sleeve part 143 extends downwards through the base 115 of the outer container and is fixed to a downwardly rounded-off portion 147 of the base 115. The whole of the container 110, 111 is supported above the lower portion 148 of the sleeve part 143 on arms 149 which are fixed to a motor housing 150 for the electromotor 140. The motor housing 150 rests on the ground on legs 151. The shaft 139 for the inner cup-shaped part 141 is detachably coupled to the shaft 152 of the electromotor at 153 outside the container 111 and so that the shaft 139 of the inner part 141 can be lifted out of engagement with the shaft 152 and the sleeve part 143, after a suitable locking engagement, not shown further, between the driving shaft 152 and the shaft 139 is released.

The electromotor 140 is designed in the usual way with an axially moveable conical rotor 140a (shown in dotted lines) which is directly connected to the driving shaft 152 and which is adapted to be lifted upwards a definite distance during starting of the motor and on stopping of the motor to fall back into place in the starting position due to force of gravity. This axial movement of the rotor is acheived due to the conical rotor 140a being drawn into and falling out from an opposite, conically-shaped stator hollow space 140b (shown in dotted lines).

The sealing arrangement shown in FIG. 6 consists of a single sealing ring 154 which is located between a first radial sealing surface 155 on the underside of the cup-shaped inner part 141 and a second radial sealing plate 156 on the sleeve part 143, more definitely on the end surface of an upper slide bearing 157 which is secured by a press fit to the sleeve part 143 and which forms a bearing fit with the shaft 139. A corresponding slide bearing 158 is fixed at the lower end of the sleeve part 143. The sealing ring 154 rests against the sealing surface 156 and is laterally supported against a shoulder portion 159 at the upper end of the sleeve portion 143. As is evident from the drawing the sealing ring is located at a radial distance from the shaft 139 and bears against the underside of the inner part 141 which extends at right angles outwards from the shaft 139 both inside the sealing ring and a substantial distance outwards of the sealing ring. The outer part 142 extends internally radially outwards from the sealing ring parallel to the under side of the inner part so that a narrow branch passage 160 is formed between the inner part 141 and the outer part 142 in alignment with the upper portion of the sealing ring, which just projects above the inner surface 161 of the outer part. The sealing ring is disposed as shown at the right of FIG. 6 to abut against the under side of the inner part 141 in a position where the electromotor is stopped. It is evident that the holes 144, 145 in the parts 141 and 142 are not in alignment with one another in this position. To the left in FIG. 6 the sealing surface 155 is lifted free from the sealing ring 154 while the holes are in alignment with one another. This position at the left of FIG. 6 is reached during starting up of the electromotor by permitting its rotor to be drawn a corresponding distance upwards in the motor's stator at the moment of starting. By means of this arrangement a rapid release of the engagament between the sealing ring and the first-mentioned sealing surface 155 can be achieved immediately the motor is set in motion, so that the friction between the sealing ring and the sealing surface 155 is insignificant. Correspondingly sealing engagement is again obtained between the sealing ring and the sealing surface 155 when the motor is disconnected and the rotor falls downwards into place in the starting position again.

By means of an ejector effect which the inner cup part 141 produces when it rotates in the outer cup part 142 and places the material in rapid flow through the through-passages 144, 145, it is ensured that the fluid which the inner container 110 contains, is not forced past the sealing ring 154 and over to the slide bearing 158, but is sucked outwards by the ejector effect. In addition to the ejector effect of the flow of material in the through-passages there is obtained at the same time during starting of the eletromotor a certain vacuum formation in the passage 160 during the lifting movement from the position which is shown at the right of FIG. 6 to the position which is shown at the left of FIG. 6, so that by means of this extra effect ingress of the fluid is prevented from the containers 110 and past the sealing ring towards the slide bearing 158.

As an extra measure there is also assistance from the peripheral lobe 162 which the sealing ring is provided with at the outer portion of the ring. The lobe 162 extends tangentially outwards from the top portion of the ring parallel to the under side of the inner part 141. At 163 there is shown an abutment groove for the lobe 162.

In an apparatus as described above there is achieved an effective sub-division of the particles in the material which is to be treated, exclusively by means of the through-passages 144, 145 in the rotatable part 141 and in the stationary part respectively. By a definite rate of revolution there is attained a definite degree of breakdown of the particles and by increasing the rate of revolution the ability to break down can be increased.

In order to obtain especially small particle sizes and at the same time maintain the rate of revolution at a reasonable level or in order to reduce the rate of revolution of the above-described arrangement, this arrangement is provided in addition with a centrifugal pump arrangement. The centrifugal pump arrangement has been obtained, as is shown in FIG. 6, by quite simply providing the inner part 141 above with an inwardly directed flange disc 164, in which there is cut out a central opening 165 which forms a feed opening to the stirring and homogenising arangement. Between the flange disc 164 and the base part 166 of the inner part there are secured vanes 167 which extend substantially radially outwards towards the vertical wall portions 168 of the inner part. By this simple measure there is obtained a substantial pressure in front of the holes 144 in the inner part 141. This pressure increase is achieved as a consequence of an accumulation of material in the space between the flange disc 164, the radial blades 167 and the base part 166 of the inner part 141 and the side walls 168 due to the effect of centrifugal force within the inner part 141. This pressure increase in front of the holes 144 will be balanced by increased rate of movement through the holes 144 and this increased rate of movement in addition to that which the effect of centrifugal force produces in the holes 144, will give an effective breaking down effect even at relatively moderate rates of revolution. Stated in another way there is achieved by this arrangement a better breaking down of the particles of material than in the arrangement described above, since one is not dependent upon such very high rates of revolution.

What I claim is:

1. A combined mixing and homogenising apparatus which comprises an inner container for the reception of material which is to be treated, a heat-exchange chamber at least partially surrounding said inner container and having conduit means for the supply and discharge of a heat-exchange medium, a stirring and homogenising arrangement received within said inner container, a prime mover for driving said arrangement, the arrangement comprising a stationary part having through-passages for said material and a rotatable part having means for subjecting the material to rapid movement through said through-passages, said rotatable and stationary parts having mutually parallel sealing surfaces, the rotatable part while at rest being sealed against the stationary part by means of said surfaces and on rotation being axially displaceable a predetermined distance relative to said stationary part to break the seal by forming a space between said surfaces, a branch passage connecting said space to said through-passages so that the flow of material through said passages exerts an ejector effect towards said branch passage thereby providing a substitute for the seal.

2. Apparatus according to claim 1, wherein the axial displacement of the rotatable part relative to the stationary part is controlled by means of the force of reaction in the rotatable part which subjects the flow of material to a reverse movement.

3. Apparatus according to claim 2, wherein the rotatable part is formed by a plate the top side of which has upwardly and outwardly extending vanes which are adapted to direct the flow of material vertically through the through-passages of the stationary part while the under side form the sealing surface of the rotatable part.

4. Apparatus according to claim 1, wherein the through-passages of the stationary part open out at a predetermined small distance from the base of the inner container so that said base forms an impact surface for the material flowing out of the through-passages.

5. A combined mixing and homogenising apparatus which comprises an inner container for the reception of material which is to be treated, a heat-exchange chamber at least partially surrounding said inner container and having conduit means for the supply and discharge of a heat-exchange medium, a stirring and homogenising arrangement received within said inner container, an electric motor including a rotor and stator for driving said arrangement, the arangement comprising a stationary part having through-passages for said material and a rotatable part having means for subjecting the material to rapid movement through said through-passages, said rotatable and stationary parts having mutually parallel sealing surfaces, said rotatable part being connected to said rotor which can be axially and electromagnetically displaced through a predetermined distance in opposite directions relative to said stator on starting up and stopping the motor, said rotatable part thus being sealed against the stationary part by means of said surfaces while at rest and on rotation being axially displaced said predetermined distance relative to said stationary part to break the seal by forming a space between said surfaces, a branch passage connecting said space to said through-passages so that the flow of material through said passages exerts an ejector effect towards said branch passage thereby providing a substitute for the seal.

6. Apparatus according to claim 5, wherein the rotatable part is freely received in an upwardly opening, cup-shaped stationary part having radially extending through-passages.

7. Apparatus according to claim 5, wherein the branch passage is located between the rotatable and stationary parts and extends radially outwards from the seal towards the through-passage.

8. Apparatus according to claim 5, wherein a sealing ring is located between the rotatable and stationary parts, said ring bearing against the stationary part and precluded from radial displacement relative to the rotatable part.

9. Apparatus according to claim 1, wherein at least the base portion of the inner container is surrounded by a heat-exchange chamber in which there is received an electric heating element, the upper portion of said container being surrounded by a cooling housing having means for the supply and discharge of cooling medium which circulates separately through the cooling housing.

10. Apparatus according to claim 5, wherein at least the base portion of the inner container is surrounded by a heat-exchange chamber in which there is received an electric heating element, the upper portion of said container being surrounded by a cooling housing having means for the supply and discharge of cooling medium which circulates separately through the cooling housing.

References Cited by the Examiner
UNITED STATES PATENTS 3,184,221   5/1965   Mould _____ 259—96 X ROBERT A. O'LEARY, *Primary Examiner.*

N. R. WILSON, *Assistant Examiner.*